US012366118B1

(12) United States Patent
Parsons

(10) Patent No.: US 12,366,118 B1
(45) Date of Patent: Jul. 22, 2025

(54) STABILIZING ASSEMBLY FOR EXTENSION LADDERS

(71) Applicant: Andrew S. Parsons, Jeffersonville, NY (US)

(72) Inventor: Andrew S. Parsons, Jeffersonville, NY (US)

( * ) Notice: Subject to any disclaimer, the term of this patent is extended or adjusted under 35 U.S.C. 154(b) by 928 days.

(21) Appl. No.: 17/300,736

(22) Filed: Oct. 14, 2021

(51) Int. Cl.
*E06C 7/42* (2006.01)
*E06C 1/12* (2006.01)
*E06C 1/22* (2006.01)

(52) U.S. Cl.
CPC ................ *E06C 7/423* (2013.01); *E06C 1/12* (2013.01); *E06C 1/22* (2013.01)

(58) Field of Classification Search
CPC ............... E06C 7/423; E06C 1/12; E06C 1/22
See application file for complete search history.

(56) References Cited

U.S. PATENT DOCUMENTS 4,565,262 A * 1/1986 Hawkins ................... E06C 7/16 182/172
4,949,809 A * 8/1990 Levi ........................ E06C 7/423 182/172
6,053,284 A * 4/2000 Fountain ................... E06C 7/42 182/180.2
8,590,671 B2 * 11/2013 Potter ....................... E06C 1/12 182/171
9,187,954 B1 * 11/2015 Parsons ..................... E06C 7/48
12,065,880 B2 * 8/2024 Gerbrandt ............... E06C 7/423
2010/0147623 A1 * 6/2010 Pocos ..................... E06C 7/423 102/200
2012/0168253 A1 * 7/2012 McMurray .............. E06C 7/423 182/172

FOREIGN PATENT DOCUMENTS

GB 2146378 A * 4/1985 ............... E06C 7/42
GB 2146688 A * 4/1985 ............. E06C 7/423

* cited by examiner

*Primary Examiner* — Adriana Figueroa
(74) *Attorney, Agent, or Firm* — Sandra M. Kotin

(57) ABSTRACT

A stabilizing assembly for extension ladders has two length adjustable legs attached to opposing sides of the base segment at the uppermost rung and two length adjustable braces attached to opposing sides of the base segment at the lowermost rung, the hollow walls of both have a three sided projection extending outward along their full length. A bracket of similar configuration encircles each leg, effects attachment of the outer end of the brace to the leg on the same side of the base segment and enables smooth movement of the brace along the leg for optimum positioning. Bolts through the hollow rungs attach the legs and braces to the base segment and pass through adapters which cooperate with the openings in the ladder rails, prevent unwanted movement, and enable spaced apart distance between the legs and the rails. A crossbar between the braces maintains proper orientation of the stabilized ladder and a pin enforces the integrity of the legs.

22 Claims, 7 Drawing Sheets

STABILIZING ASSEMBLY FOR EXTENSION LADDERS

FIELD OF THE INVENTION

The instant invention relates to a stabilizing assembly that attaches to the base section of an extension ladder to prevent any lateral movement, slippage or distortion of the ladder under considerable work loads and on varied terrain.

BACKGROUND OF THE INVENTION

U.S. Pat. No. 9,187,954 to Parsons discloses a stabilizing assembly for use with extension ladders and also teaches several steps to set the angle and orientation of the stabilizing assembly and to determine at which rung to make the attachment to the ladder. This system works quite well but requires time and patience to complete the set-up while lacking certain refinements found to be necessary to insure optimum performance and safety. U.S. Pat. No. 9,187,954 is incorporated by reference herein in its entirety.

The weight load balanced on an extension ladder using the above-noted stabilizing assembly is distributed between the base section of the ladder and the stabilizer legs and braces. That assembly utilizes a simple telescoping leg that incorporates the well-known spring activated buttons to set the length of the legs and braces thereby assuming that considerable weight be held secure by those buttons and that rotation of one segment with respect to the other is prevented. The clamp system utilized to attach the braces to the legs permitted much lateral and rotational movement that could pose potential problems when a considerable weight load is necessary to a job or the ground beneath the ladder is uneven. The instant invention serves to correct these issues and provides additions and refinements to greatly improve the performance of the stabilizing assembly, the safety of the user, and the ease of assembly and take-down as well as a compact arrangement for transport and storage.

One of the improvements for the instant invention lies with the telescoping legs and braces and the slidable bracket used to connect one to the other. The instant invention also incorporates a series of new developments to greatly enhance performance.

There have been a number of inventions in the field of the telescoping leg, or post, to prevent rotational movement during use. Some inventors have devised various internal structures to prevent the rotation of the outer post with respect to the inner post. (See U.S. Pat. No. 2,668,386 to Benner, Jr. and U.S. Pat. No. 5,249,881 to Austin, Jr. et al.) Other inventors have found that posts that are non-circular in cross section will solve this problem quite well. Balint et al. in U.S. Pat. No. 4,325,157 teaches an extension handle with an inner tube having a groove along its full length and an outer tube that has a tongue formed by vertically folding the seam of the tube during manufacture. The tongue slides along the grove when the two sections are lengthened or retracted and there is no rotational movement. In U.S. Pat. No. 4,932,622, Hayakawa has chosen a unique six sided cross-sectional shape for the two sections of each leg of his camera tripod support. This shape has two sets of opposing surfaces and two angled surfaces so that no rotational movement is possible. The shape taught here is also central to the mechanism that Hayakawa uses to set the two posts securely at any desired length without the need for the usual openings and spring activated buttons.

Kuo teaches a telescopic umbrella handle in three segments, each segment of circular cross section while including a longitudinal groove along its full length that completely prevents rotation of one segment with respect to the next. (U.S. Pat. No. 5,387,048) Baum teaches a multiple segment telescoping "hot stick" for use in the repairs of electrical equipment where each segment is substantially triangular in cross section. The triangular sections are rounded at the apices so that they slide easily one within the other. Another substantially triangular segmented post designed to support a birdhouse is taught by McClasky in U.S. Pat. No. 6,343,568. This system utilizes multiple segments, with some segments having inner walls with grooves and splines to lessen friction when the sections are expanded or retraced to set up or take down the birdhouse.

All of the above-noted patents teach telescoping posts that are just designed for one purpose. None of them require additional structures, or brackets, that are external to the telescoping post and are needed to slide over the post once it is extended. None of the telescoping posts of the above noted patents are designed to support considerable weight. Some of the shapes disclosed may be able to accommodate an external bracket, but most of them could not function according to the requirements of the instant invention.

There is a need for a telescoping post structure that permits easy sliding of one segment with respect to the other, eliminates all rotational movement, and that additionally can accommodate an external bracket that slides over the post and yet remains in a linear track to maintain the ladder stabilizer in the best possible orientation.

There is a need to have the legs attached to the ladder in such a manner that there can be no lateral movement while allowing the legs to pivot and swivel to attain proper orientation, and not scrape against the ladder rails when being set up at a worksite.

There is also a need to prevent the legs from extending too far outward of the ladder rails, to insure that the settings of the legs cannot be disturbed regardless of the weight load carried on the ladder, and to accommodate the ladders of many manufacturers.

BRIEF SUMMARY OF THE INVENTION

The instant invention offers significant improvements over the ladder stabilizer of the '954 patent. The segments of the telescoping legs and braces of the instant invention were designed with a cross sectional shape that is substantially round with a substantially rectangular projection that is contiguous with the walls of the segments and extends along their entire length. This shape completely prevents any rotational movement when the legs and braces are extended. The straight brackets have been replaced by a bracket that is of the same cross sectional shape as the segments of the legs and that slides easily over the outer segment with minimal tolerance thereby making the setup and takedown of the assembly smooth and expeditious. Since the telescoping legs bear the weight of the ladder load, additional safety pins have been added to be set just below the spring activated buttons to insure that the setting of the length of the legs is maintained. This pin goes completely through both segments of the legs so there can be no collapse or distortion of the support assembly under considerable weight loads. A crossbar has been added for placement across the braces to prevent lateral movement and fix the angle and distance between the legs. An adapter accommodates the opening variances in the rails of ladders of different manufacturers, provides a tight attachment of the leg assemblies, and insures sufficient spacing between the legs and the ladder rails for ease of setup and takedown. An attaching bolt has been designed to prevent scratches to any surfaces in contact during transport and C-clips were added to seat the cross bar and to hold the leg assemblies securely during transport and storage.

It is an object of the instant invention to provide a stabilizing assembly for extension ladders that provides telescoping leg and brace segments that can have no rotational movement and will securely support the ladder under considerable weight loads while being set at an optimum angle.

It is another object of the instant invention to have a slidable bracket with which the braces are attached to the legs, and which conforms to the shape of the legs, allows no rotational movement, and can support considerable weight loads thereby enabling the ladder to be maintained securely at the appropriate orientation for optimum use and under all work conditions.

It is also an object of the instant invention to insure that once the assembly has been attached to the ladder it can accommodate any work site and can remain attached to the ladder during transport and storage.

Another object of the instant invention is to provide a length adjustable crossbar extended between the braces when the ladder is set for use to prevent the legs from moving laterally or rotationally while maintaining the legs at an optimal distance apart at each worksite regardless of the terrain.

A further object of the instant invention is to provide safety pin assemblies to insure that the legs cannot collapse under heavy work loads.

It is another object of the instant invention to provide a stabilizing assembly that is attached to the extension ladder with the assistance of an adapter to account for differences in the size of the openings in the ladder rails and to insure there can be no movement of the attaching bolt once the stabilizing assembly is in place.

It is a further object of the instant invention to provide a ladder stabilizing assembly that is easy to attach to the extension ladder, maintains proper orientation of ladder, can be folded against the ladder for transport and storage, and can maintain the stability of the ladder under any work condition and under considerable weight loads.

A still further object of the instant invention is to provide additional reinforcement at points of attachments of all elements to provide additional strength and to eliminate stress damage at such points of attachments.

The instant invention is a ladder stabilizing assembly for use with an extension ladder having a base segment and an extendable second segment, each segment composed of parallel side rails connected by a series of evenly spaced apart hollow rungs the ends of which communicate with similarly shaped openings in the side rails, the stabilizing assembly comprises two length adjustable legs having an upper end and a lower end for attachment of the upper end on opposing sides of the base segment at an uppermost rung thereof, the legs having a non-circular cross section, two length adjustable braces, a first brace and a second brace, each having an inner end and an outer end for attachment of the inner end on opposing sides of the base segment at a lowermost rung thereof, the braces having a non-circular cross section, and a substantially cylindrical bracket permanently and slidably disposed about each leg for securely attaching the outer end of each brace to the leg situated on the same side of the base segment for smooth movement along said leg and for optimum orientation of the extension ladder, and the bracket having a non-circular cross section. There is also a heim joint securely affixed to the upper end of each leg and to the inner end of each brace through which the legs and braces are attached to the base segment, the heim joints to enable the legs and braces to pivot and swivel for proper orientation of the stabilized extension ladder, bolt assemblies for attachment of the legs and braces through the uppermost and lowermost rungs of the base segment and to pass through the heim joints with minimal tolerance, adapters interposed between the heim joints and the openings in the ladder rails through which the bolt assemblies are accommodated such that said bolt assemblies cannot move laterally or transversely when properly positioned within the ladder rungs and the legs and braces are maintained minimally spaced apart from the ladder rails such that the legs and braces can be easily positioned to stabilize said extension ladder; a length adjustable cross bar having a first end and a second end extending between the two braces to limit lateral movement of the legs when the ladder is set for use wherein the crossbar is pivotally affixed at the first end to the first brace and reversibly affixed at the second end to the second brace, and means for reversibly affixing the second end of the cross bar to the second brace.

The instant invention is also a ladder stabilizing assembly for use with an extension ladder having a base segment and an extendable second segment, each segment composed of parallel side rails connected by a series of evenly spaced apart hollow rungs the ends of which communicate with similarly shaped openings in the side rails comprising two length adjustable legs having an upper end and a lower end for attachment of the upper end on opposing sides of the base segment at an uppermost rung thereof, the legs comprising an outer segment and an inner segment, the segments being substantially tubular with a projection extending outward from the wall, along its full length and integral therewith, the projection on the inner segment being substantially square in cross section and the projection on the outer segment being substantially rectangular in cross section and dimensioned to slide smoothly over the square projection when the leg is length adjusted, a series of evenly spaced apart opposing openings along the full length of the outer segment at substantially 90° from the projection, and the inner segment having opposing openings at an inner end thereof and two spring activated buttons situated within the inner segment such that the spring activated buttons extend outward of the opposing openings to communicate with selected opposing openings in the outer segment to set the length of said legs. There are two length adjustable braces, a first brace and a second brace, each having an outer end and an inner end for attachment of the inner end on opposing sides of the base segment at a lowermost rung thereof the braces comprising an outer segment and an inner segment, the segments being substantially tubular with a projection extending outward from the wall along its full length and integral therewith, the projection on the inner segment being substantially square in cross section and the projection on the outer segment being substantially rectangular in cross section and dimensioned to slide smoothly over the square projection when the brace is length adjusted, a series of evenly spaced apart opposing openings along the full length of the outer segment at substantially 90° from the projection, the inner segment having opposing openings at an inner end thereof and two spring activated buttons situated within the inner segment such that the spring activated buttons extend outward of the opposing openings to communicate with selected opposing openings in the outer segment to set the length of the brace, and the inner segment having opposing openings proximate the outer end thereof. There is also a substantially cylindrical bracket slidably disposed on each leg for securely attaching the outer end of the brace to the leg situated on the same side of the base segment, the bracket comprising a substantially rectangular projection extending outward of the wall thereof and integral therewith, the projection dimensioned to slide smoothly over the rectangular projection on the outer segment of the leg, two arms extending downward from the cylindrical bracket substantially opposite said projection and spaced apart to admit the outer end of the brace therebetween, the arms each having an aperture proximate a lower end dimensioned to communicate with the opposing openings proximate the outer end of the brace, a bolt to cooperate with the openings and a nut to achieve a secure attachment. The instant invention includes means disposed on the upper ends of the legs and the inner ends of the braces through which the legs and braces are attached to the base segment, and for enabling said legs and braces to pivot and swivel for proper orientation of the stabilized extension ladder, bolt assemblies for attachment of the legs and braces through the uppermost and lowermost rungs of the base segment and to pass through the pivot and swivel means with minimal tolerance and through the ladder rungs with ease, adapters interposed between the pivot and swivel means and the openings in the ladder rails through which the bolt assemblies are accommodated such that said bolt assemblies cannot move laterally or transversely when properly positioned within the ladder rungs and the legs and braces are maintained minimally spaced apart from the ladder rails such that the legs and braces can be easily positioned to stabilize said extension ladder, a length adjustable cross bar having a first end and a second end extending between the two braces to limit lateral movement of the legs when the ladder is set for use wherein the crossbar is pivotally affixed at the first end to the first brace and reversibly affixed at the second end to the second brace, means for reversibly affixing said second end to the second brace, and means for maintaining the integrity the legs so as to permit heavy loads to be carried on the ladder.

The instant invention includes a ladder stabilizing assembly for use with an extension ladder having a base segment and an extendable second segment, each segment composed of parallel side rails connected by a series of evenly spaced apart hollow rungs the openings of which communicate with similarly shaped openings in the side rails, the stabilizing assembly comprising two length adjustable legs for attachment on opposing sides of the base segment at an uppermost rung thereof, each leg having an upper end and a lower end and comprising an outer segment and an inner segment, the segments being substantially tubular with a projection extending outward from the wall, along its full length and integral therewith, the projection on the inner segment being substantially square in cross section and the projection on the outer segment being substantially rectangular in cross section and dimensioned to slide smoothly over the square projection when the leg is length adjusted, a series of evenly spaced apart opposing openings along the full length of the outer segment at substantially 90° from the projection, and the inner segment having a first set and a second set of spaced apart opposing openings proximate an inner end thereof and two spring activated buttons situated within said inner segment such that the spring activated buttons extend outward of the first set of opposing openings to communicate with selected opposing openings in the outer segment to set the length of the leg, two length adjustable braces for attachment on opposing sides of the base segment at a lowermost rung thereof, each brace comprising a first end and a second end, an outer segment and an inner segment, said segments being substantially tubular with a projection extending outward from the wall, along its full length and integral therewith, the projection on the inner segment being substantially square in cross section and the projection on the outer segment being substantially rectangular in cross section and dimensioned to slide smoothly over the square projection when the brace is length adjusted, a series of evenly spaced apart opposing openings along the full length of the outer segment at substantially 90° from the projection, the inner segment having opposing openings proximate an inner end thereof and two spring activated buttons within the inner segment such that the spring activated buttons extend outward of the opposing openings to communicate with selected opposing openings in the outer segment to set the length of the brace, and the inner segment having opposing openings proximate an outer end thereof, a heim joint securely affixed to the upper end of each leg and to the first end of each brace through which the legs and braces are attached to the base segment, the heim joints to enable the legs and braces to pivot and swivel for proper orientation of the stabilized extension ladder, means for attaching the legs and braces to the base segment, and a cylindrical bracket slidably disposed on each leg for securely attaching the second end of the brace to the leg situated on the same side of the base segment, the bracket comprising a substantially rectangular projection extending outward of the wall thereof and integral therewith, the projection dimensioned to slide smoothly over the rectangular projection on the outer segment of the leg, two arms extending downward from the cylindrical bracket substantially opposite said projection and spaced apart to admit the second end of the brace therebetween, the arms each having an aperture proximate a lower end dimensioned to communicate with the opposing openings proximate the outer end of the inner segment of the brace, a bolt to cooperate with the openings and a nut to achieve a secure attachment.

BRIEF DESCRIPTION OF THE DRAWINGS

FIG. 16-A is a close-up view of the bolt assembly on the cross-bar;

DETAILED DESCRIPTION OF THE INVENTION

Figure 1:
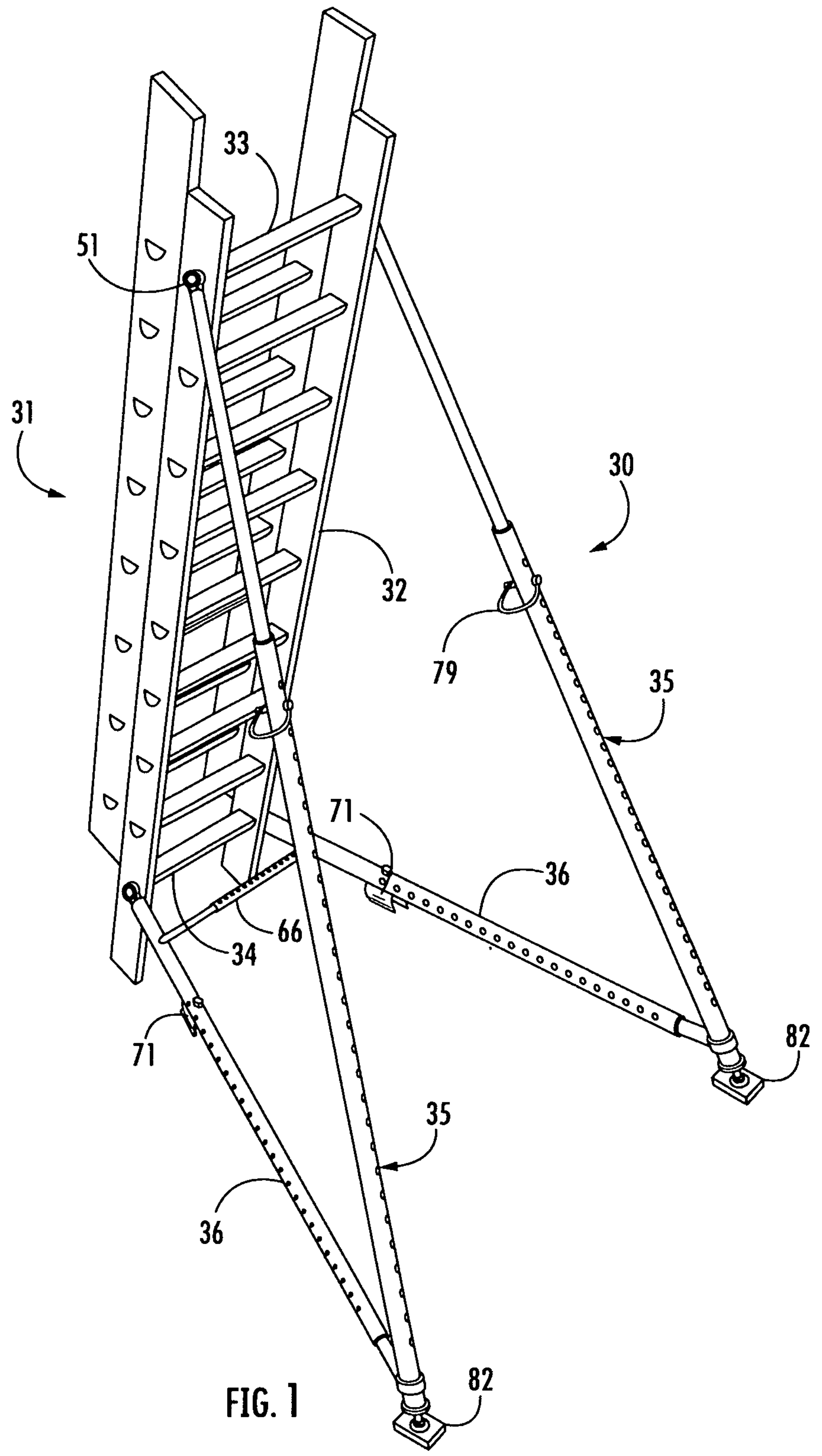
FIG. 1 is a perspective view of an extension ladder with the stabilizing assembly of the instant invention attached and ready for use.

The ladder stabilizing assembly 30 of the instant invention, seen in FIG. 1, may provide a series of improvements and innovations over the stabilizing assembly of the '954 patent. The basic components of the stabilizing assembly, the legs and braces, may continue to be the main support and stabilizing means for an extension ladder. However, the instant invention may provide an easier-to-assemble and stronger stabilizing assembly resulting in a safer and more stable ladder capable of accommodating heavier work loads. The '954 patent emphasized the attachment of the legs of the stabilizing assembly at one-half the working length of the extended ladder. This arrangement required the attachment to be re-set each time the ladder had to be moved to a different location at the same or at another work site. The instant invention may provide a more usable placement, i.e., that the legs of the stabilizing assembly 30 be set through the uppermost rung 33 of the base 32 of the extension ladder 31 and the braces be set through the lowermost rung 34 of the base of the extension ladder, for all uses, while maintaining the stabilized ladder at a safe angle. This arrangement may enable the stabilizing assembly 30 to be permanently installed on the extension ladder just once, which may save considerable time at each new work site while providing excellent stability for all ladder length extensions and placements. This one-time installation may be a practical improvement for many jobs, i.e., painting a building or installing siding, which usually require the ladder to be moved from one place to another as the job progresses. Both the legs 35 and the braces 36 of the stabilizing assembly 30 may be fully adjustable to accommodate the work site and the terrain regardless of the frequency of having to move the ladder from one place to another.

An important part of the improved ladder stabilizing assembly 30 may be the design of the legs 35 and braces 36 as well as the means of slidably attaching the braces 36 to the legs 35. The '954 patent describes both the legs and braces as being length adjustable and formed from the common two segment slidable posts. The instant invention may also utilize the two segment slidable post arrangement, but with a new structural element that may insure better stability and strength over a wider range of ladder loads.

Figure 2:
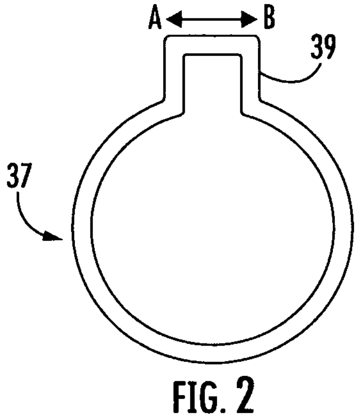
FIG. 2 is a cross-sectional view of the inner post of the leg and brace.
Figure 3:
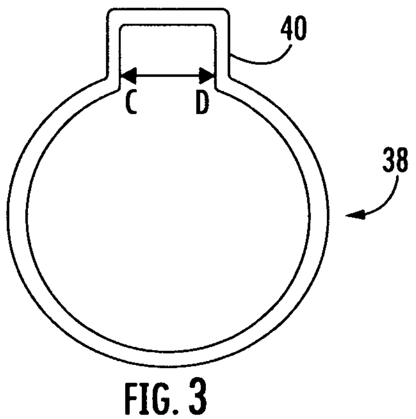
FIG. 3 is a cross-sectional view of the outer post of the leg and brace.

The most well known adjustable post arrangements may be tubular in construction with a circular cross section, an inner segment fitted with dual spring activated buttons extending through opposing openings in the segment wall, and an outer segment having a line of opposing openings along each side of the segment wall such that the spring activated buttons may protrude through chosen opposing openings to set the adjustable post at the desired length. The legs 35 and braces 36 of the instant invention may both be fully length adjustable, also utilizing two segments, an inner segment and an outer segment, and spring activated buttons. However, both the legs 35 and braces 36 of the instant invention may have a different cross sectional configuration. The cross section of both of the segments of the legs and braces may be substantially round but with a substantially square component 39 projecting outwardly from the wall of the inner segment 37 (FIG. 2), integral therewith, and extending along its full length. The outer segment 38 may have a slightly more rectangular projection 40 (FIG. 3), integral with the wall and extending outwardly along its full length. There may also be a series of evenly spaced opposing openings 41 along the full length of the outer segment 38 at substantially 90° from the projection 40. A leg 35 and brace 36 may be seen in FIGS. 4 and 5. The thickness of the walls including the projections may be uniform. This may be seen in FIGS. 2 and 3. The inner width C-D of the projection 40 on the outer segment 38 must be sufficient to enable the outer segment 38 to slide easily over the outer width A-B of the projection 39 along the length of the inner segment 37. The dimensions of these projections may provide easy linear movement of the outer segment over the inner segment while completely preventing any rotational movement or wobble. The improved slidable segments may also provide a stronger support system for the stabilizing assembly in the manner of having a longitudinal reinforcement strip along the length of each segment thereby permitting heavier loads to be tolerated than were possible with the assembly of the '954 patent.

As with the '954 patent, the braces 36 may be affixed to the legs 35 in such a manner to be slidable along the legs 35 and to enable flexibility during storage and for proper orientation as needed at each work site. It was found that the straight bracket and pin utilized in the '954 patent provided too much rotation and wobble as well as questionable security at this critical attachment point. A new bracket 42 designed to cooperate with the structure of the legs 35 may enable the braces 36 to slide easily along the legs 35 to attain the best placement and orientation of the extension ladder according to the demands of the work site while completely eliminating rotational movement and wobble as well as unwanted lateral movement at the point of attachment.

Figure 6:
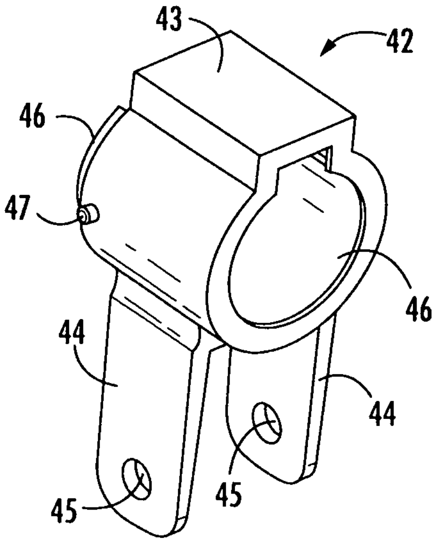
FIG. 6 is a perspective view of the bracket.
Figure 7:
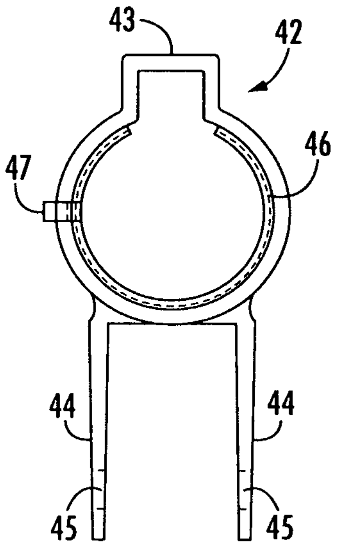
FIG. 7 is an end view of the bracket of FIG. 6.

This bracket 42 may be substantially circular in cross section, but also with a substantially rectangular projection 43 extending outwardly from the wall, integral therewith, and dimensioned to slide easily over the outer segment 38 of the leg 35. There may be two parallel planar arms 44 extending downward from the exterior of the bracket 42 substantially opposite the projection 43. An aperture 45 may be disposed proximate the end of each arm 44 as may be seen in FIGS. 6 and 7. To act as a lubricant and assure smooth slidability of the bracket 42 over the outer segment 38 of the leg 35 and to prevent damage to the contact surfaces, there may be a polymeric liner 46 around the circler portion of the inner wall of the bracket 42. A set pin 47, seen in FIG. 6, placed into an opening in the side of the bracket 42 may maintain the liner 46 in place. There may be a second set pin on the opposite side of the bracket 42 (not illustrated). The liner 46 interposed between the bracket 42 and the outer segment 38 of the leg 35 may also function as a spacing means which, though the liner 46 does not extend into the projection 43 on the bracket 42, may provide sufficient space to prevent the inner wall of the bracket projection 43 from contacting the outer wall of the leg projection 40 on the outer segment 38 of the leg 35 so there is no friction created in that area when the bracket 42 is moved along the leg 35. See FIGS. 6, 7 and 9. The bracket 42 may be placed on the outer segment 38 of the leg 35 when the legs are assembled during manufacture. A leg 35 with attached brace 36 (a leg assembly) may be seen in FIG. 8.

To insure that the bracket 42 cannot be removed from the leg 35, a stop block 80 may be situated some 6 in (15.24 cm) above the end of the outer segment 38. This stop block 80 may also serve another purpose. When positioning the ladder at a work site each brace 36 may be moved downward along a leg 35 until it contacts the stop block 80. This may provide the optimum setting for the brace 36 and may result in the braces 36 lying substantially parallel to the ground and even with the lowermost rung 33 of the ladder for optimum stability.

To attach the braces 36 to the legs 35 there may be two opposing openings 48 at the exposed end of the inner segment 37 of each brace 36, which are of substantially the same bore as the opposing apertures 45 in the ends of the bracket arms 44. The end of the brace with the openings 48 may be brought to the bracket 42 and inserted between the two arms 44 such that the openings 48 in the end of the brace align with the apertures 45 in the two arms 44. A bracket bolt 49 with cooperating nut 50 may be inserted through the four aligned openings to complete the attachment which may be seen in FIG. 9.

Figure 4:
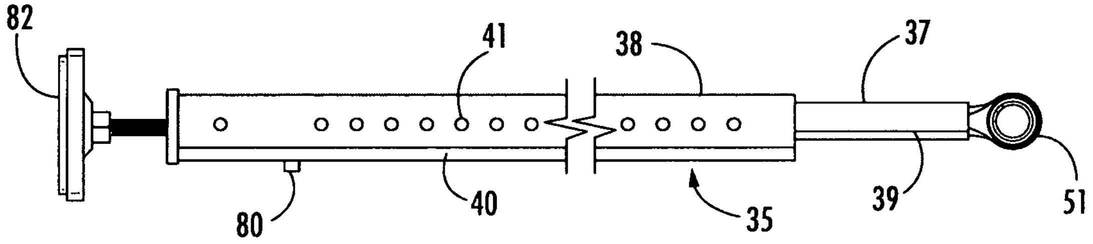
FIG. 4 is a side view of the leg.
Figure 5:
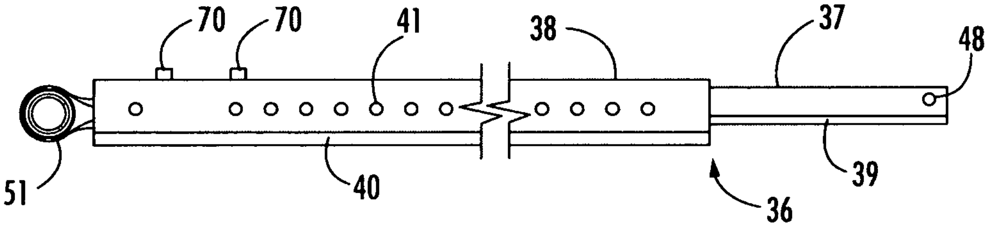
FIG. 5 is a side view of the brace.
Figure 8:
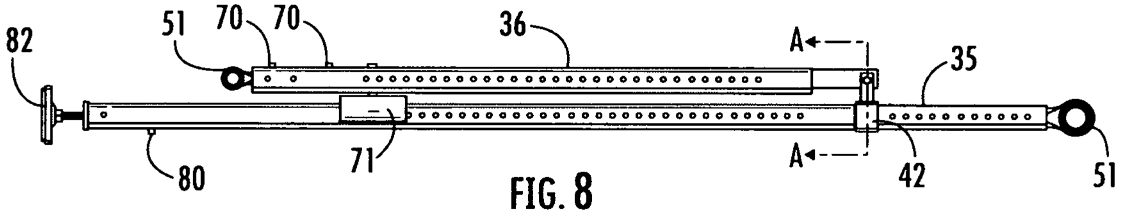
FIG. 8 is a top plan view of a leg with attached brace.

As was described in the '954 patent, heim joints were utilized to enable the legs and braces to pivot and swivel as needed to properly orient the stabilized extension ladder. The instant invention may also utilize heim joints to fulfill the same functions. A heim joint 51 may be permanently attached to the exposed end of the inner segment 37 of each leg 35, as seen in FIGS. 4 and 8. There may also be a heim joint 51 permanently attached to the end of the outer segment 38 of each brace 36 which may be seen in FIGS. 5 and 8. The heim joints 51 may enable the legs 35 and braces 36 to pivot and swivel about their points of attachment to the extension ladder. This flexibility at both points of attachment may enable the ladder with the support assembly in place to be set, adjusted, properly oriented, and safely accommodate a user under any work place requirement.

As noted above, the legs 35 of the support assembly may be attached to the extension ladder through the uppermost rung 33 of the base section 32 and the braces 36 similarly attached through the lowermost 34 rung. In the '954 patent these attachments were made by passing a rod with threading at both ends through the heim joint on one leg, the rung, and the heim joint on the leg on the opposite side of the ladder and fastened with a nut at each end of the rod. If the nuts were fastened too tightly the legs would be scraping against the ladder and if too loosely they would not provide the necessary stability. Additionally, the rough threaded ends of the rod would often scratch and mar any surfaces with which they came in contact during transport and storage. Two new elements may be made a part of the support assembly 30 of the instant invention that may correct these shortcomings of the prior art.

Figure 10:
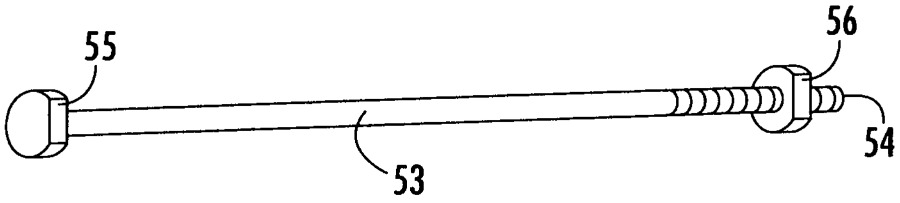
FIG. 10 is a side view of the bolt assembly.
Figure 11:
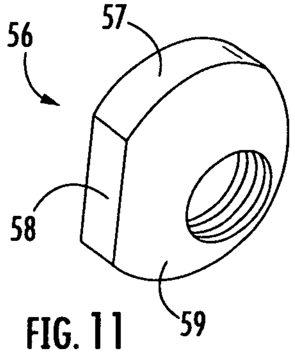
FIG. 11 is a perspective view of the nut of the bolt assembly.

First, a new bolt assembly was designed which may securely attach the legs to the extension ladder and also minimize any damage to surfaces that may be contacted during transport or storage. Since the stabilizing assembly 30 of the instant invention may utilize the uppermost rung and lowermost rung of the ladder for all work sites, it need not be removed from the ladder after the initial installation. Therefore, the bolt assembly may provide a permanent means of attaching the stabilizing assembly 30 to the extension ladder 31. This bolt assembly may include the newly designed bolt 53 and corresponding nut 56. The bolt 53 may be of sufficient length to pass through the heim joints of two legs (and braces) and the rung of the ladder. The bolt 53 may have a threaded end 54 of sufficient length to extend beyond the second heim joint and accommodate the nut 56 for a wide range of extension ladders. Once the installation may be complete, any extra length of the threaded end 54 of the bolt 53 may be removed. The head 55 of the bolt 54 and the nut 56 may have the same design, the side edges of both having two opposing convex side surfaces 57, two opposing flat side surfaces 58, and a partially convex top surface 59 as may be seen in FIGS. 10, 11 and 12.

Most extension ladders may have hollow rungs. Many of the hollow rungs may be flat on the top, the contact surface, and the remaining surface being rounded. The communicating openings in the sides of the rails of these ladders may have that same shape, i.e., substantially a half moon opening. The actual size of the half-moon openings in the ladder rails may vary considerably from one-manufacturer to another and often with the multiple ladders made by the same manufacturer. This range in the size of the openings may present issues during the installation of the stabilizing assembly 30. The bolt 53 may be of smaller diameter than the openings in the rails to accommodate all ladders which may cause movement of the bolt within the opening resulting in unsteadiness. To completely eliminate any such problems, an adapter 60 has been designed to fit into the openings of a wide variety of ladder rails and eliminate all movement of the bolt once the installation has been completed.

Figure 13:
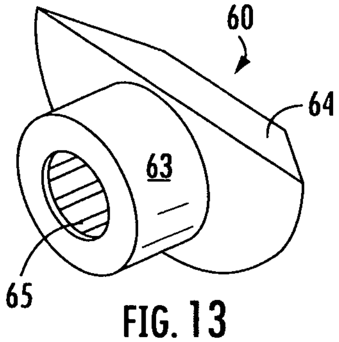
FIG. 13 is a rear perspective view of the adapter.
Figure 14:
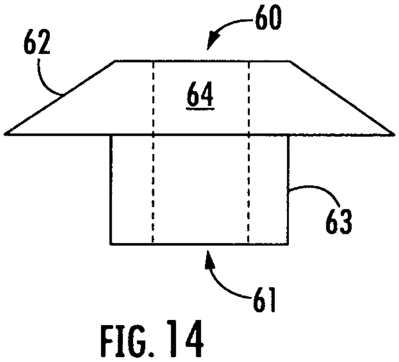
FIG. 14 is a top plan view of the adapter.
Figure 15:
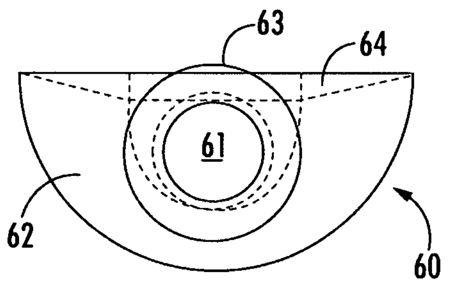
FIG. 15 is front plan view of the adapter.

The adapter 60 may not only prevent any movement of the bolt 53, but it may serve another purpose. If the legs 35 of the support assembly 30 are too tightly installed against the ladder rails they may be difficult to maneuver into the desired orientation, and if too loosely installed, may not provide the desired stability. The adapter 60 may enable just enough space between the legs 35 and the ladder rails with no resistance to the legs reaching a desired orientation, while preventing any side contact between the legs and the ladder rails as they are positioned. The adapter 60 may be composed of a substantially rigid and wear-resistant polymeric material that can be injection molded to conform to the shape needed to accommodate the the size differences and dimensions found in the openings of a variety of ladder rails. The composition of the adapter 60 may enable the retention of its shape through extensive use. The adapter 60 for use with the half moon openings in the ladder rails may have a substantially cylindrical shank 63 integral with a half-moon shaped forward portion. A bore 61 through the adapter 60 may receive the bolt 53 with minimal tolerance. The bore 61 may be smooth or may have a series of axial splines 65 about the inner surface. The splines 65 may provide proper alignment for the bolt 53 with the least friction between the outer surface of the bolt 53 and the inner surface of the adapter 60. The forward portion of this adapter may be three dimensional and, as noted, substantially half moon shaped when viewed from the front as seen in FIG. 15. There may be a flat top surface 64, tapered side surfaces 62, and tapering front comprising the forward portion of the adapter 60. Adapters for other shaped openings may also have the tapered forward portion. The forward portion may be inserted into the openings in the ladder rails. It is this tapered forward portion that may enable the adapter 60 to provide a tight fit into the variously sized openings in the rails of many different extension ladders. See FIGS. 13, 14 and 15.

Figure 12:
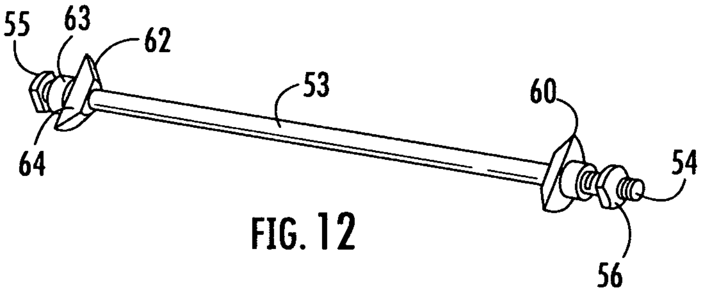
FIG. 12 is perspective view of the bolt assembly with two adapters.

To attach the legs 35 to the uppermost rung 33 of the extension ladder 31 the threaded end 54 of the bolt 49 may be inserted through the heim joint 51 of one leg 35 and through one adapter 56, with the shank 63 of the adapter facing the heim joint 51 and in contact therewith. The bolt 53 may then be inserted into the ladder rail until the threaded end 54 extends outward of the opening in the opposing ladder rail. The second adapter 56 may be placed onto the bolt 53 so that the tapered forward portion faces the ladder rail and is inserted into the opening in the rail as far as possible. The second leg 35 may be added by having the heim joint 51 placed onto the exposed threaded end 54 of the bolt 53. The nut 56 may thereafter be threaded onto the threaded end 54 and tightened. Any extra length of the threaded end 54 of the bolt 53 extending beyond the nut 56 may be cut away. The opposing flat surfaces 58 on the bolt head 55 and the nut 56 may enable a tight adjustment with a wrench. Once the installation of the legs 35 has been completed, the braces 36 may be similarly attached to the lowermost rung 34 of the base 32 of the extension ladder using a second bolt 53 with adapters 60 as seen in FIG. 12. The ladder with the stabilizing assembly attached may then be set up and the legs properly oriented for the job at hand. The completed assembly may be seen in FIG. 1.

Figure 16:
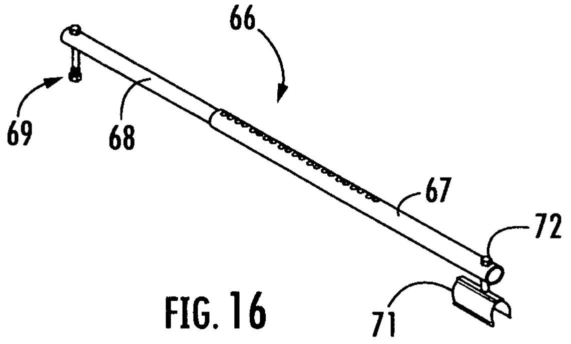
FIG. 16 is a perspective view of the cross bar.
Figure 16A:
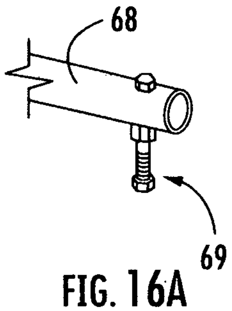
Figure 17:
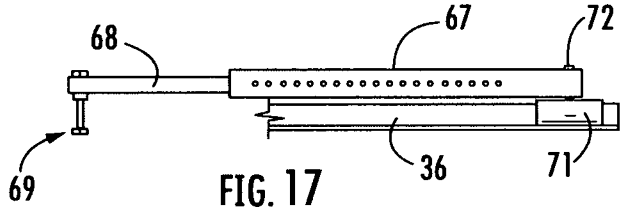
FIG. 17 is side view of the cross bar with the end of a brace.
Figure 18:
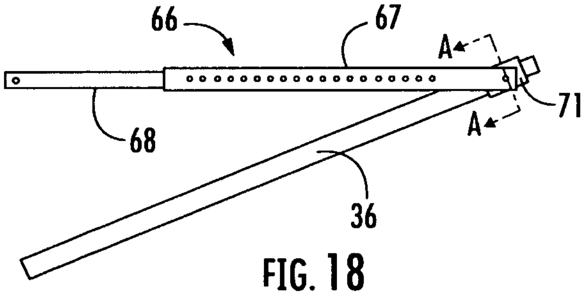
FIG. 18 is a top plan view of the cross bar with the end of a brace.
Figure 19:
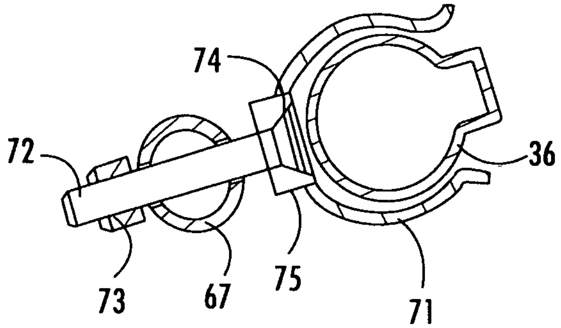
FIG. 19 is a a cross sectional view through line A-A of FIG. 18.
Figure 20:
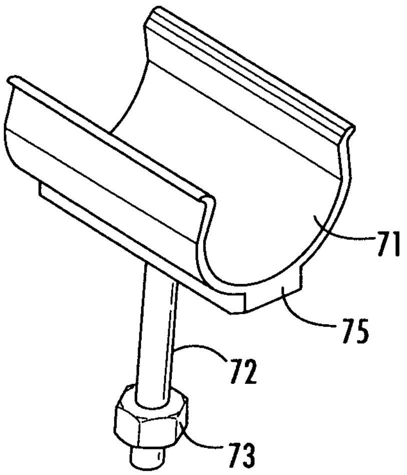
FIG. 20 is a perspective view of the C-clip and bolt.
Figure 21:
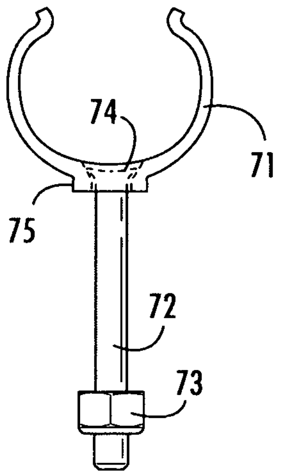
FIG. 21 is a front view of the C-clip and bolt of FIG. 20.

When the prior art stabilizing assembly was in use it was found that though the legs could be set at any orientation and distance apart there was too much leeway in their positioning and at times the resulting set-up was not as stable as desired. Through repeated use it was found that confining the legs to a more defined area may provide better support and stabilization of the assembly. The proper selection of the size of the heim joint was helpful in limiting the range of movement of the legs but it was also found that providing a cross bar 66 to connect one brace to the other restricted the degree of separation of the legs and prevented any unwanted lateral movement. The cross-bar 66 may be length adjustable so that the optimum separation of the legs may be obtained for each specific work site. There may be an inner 68 and outer 67 segment of the cross-bar utilizing the conventionally round cross section adjustable post arrangement. One end of the inner segment 68 of the cross-bar 66 may be attached to a brace 36, the holding brace, by means of a bolt assembly 69 that may consist of a bolt of sufficient length to pass through opposing openings in the inner segment 68 of the cross-bar 66 and opposing openings in the outer segment 38 of the brace and two nuts. One nut may lie between the brace 36 and the cross-bar 66 and the second nut at the end of the bolt on the opposite side of the outer segment 38 of the brace 36. See FIGS. 16 and 16A. The nut lying between the brace 36 and the cross-bar 66 may provide sufficient separation of the two elements to enable free rotation of the cross-bar 66 when attaching the opposing end to the other brace 36.

To attach the opposing end of the cross-bar 66 to the other brace 36 there may be an elongated semi-rigid C-shaped clip 71 affixed at the far end of the outer segment 67 of the cross-bar 66 by means of a bolt 72. An extended ridge along the underside of the clip 71 may form a base 75 of sufficient depth and having a central opening to countersink the head 74 of the bolt 72 thereby preventing contact between the head of the bolt and the brace to which it may be reversibly attached. The bolt 72 may have a shaft of sufficient length to pass through the clip base 75 and extend through openings in the end of the outer segment 67 of the cross-bar 66. The bolt 72 may be held in place by a nut 73 secured at the end of the bolt 72 as may be seen in FIGS. 17 through 21. During transport and storage this clip 71 may be used to maintain the cross-bar 66 against the holding brace 36 to prevent it from movement. Though semirigid, the clip 71 may be sufficiently resilient to remain intact after repeated use.

When the extension ladder has been set at a work site, and the legs 35 and braces 36 have been properly positioned, the clip 71 on the end of the cross-bar 66 may be released from the holding brace 36 and the cross-bar 66 rotated outward and length adjusted as needed for attachment to the opposing brace 36. The C-shaped clip 71 may then be pressed against the opposing brace 36 until it snaps into place between two positioning blocks 70 provided to receive the clip 71 and located near the end of the outer segment 38 (these may be seen in FIG. 5) thereby maintaining the two braces 36 at the desired distance apart and restricting any further lateral movement of the legs 35. See FIGS. 1, 16, 17 and 18.

There may be two additional C-clips 71, one attached to the free end of the outer segment 38 of each brace 36 to hold the brace 36 against the leg 35 to which it may be attached during transport and storage. These clips 71 maybe seen in FIG. 1. These additional C-clips may enable the stabilizing assembly 30 to be folded against the ladder rails forming a single compact unit.

The stabilizing assembly 30 of the instant invention may be designed to maintain the extension ladder in a safe and stabile orientation and to accommodate a wide range of work assignments and work loads. The legs 35 and braces 36 of the stabilizing assembly 30 of the instant invention have been designed with the non-circular cross-section to eliminate any rotation or wobble of the outer segment with respect to the inner segment and the bracket 42 has been designed to remove rotation while providing smooth movement over the leg resulting in increased stability and security over the prior art as well as to greatly facilitate placement and orientation at each work site. These design changes may also increase the strength and weight bearing capacity of the assembly. However, the length adjustable legs 35 of the stabilizing assembly 30 retain the traditional spring activated buttons extending through openings in the outer segments to set their lengths. The legs 35 may bear the brunt of the weight load supported on the ladder. To insure that there can be no chance of slippage between the outer 38 and inner 37 segments of the legs 35 an additional safety measure may be provided.

Figure 22:
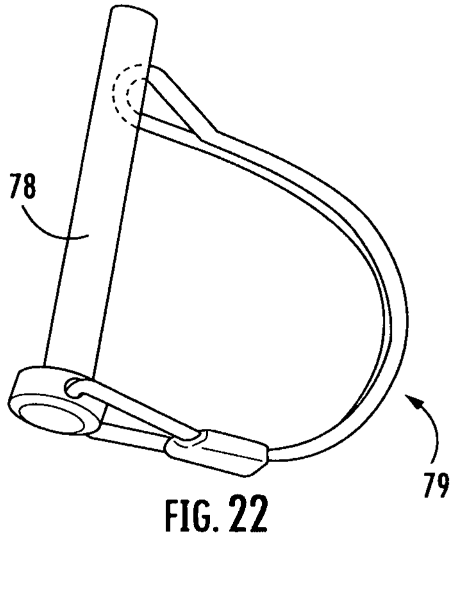
FIG. 22 is a perspective view of a pin clamp.
Figure 23:
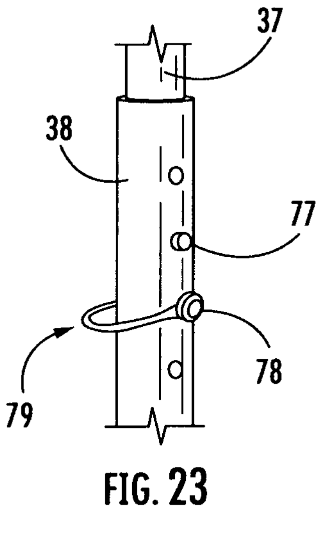
FIG. 23 is a side view of a portion of a leg with the pin clamp in place.
Figure 24:
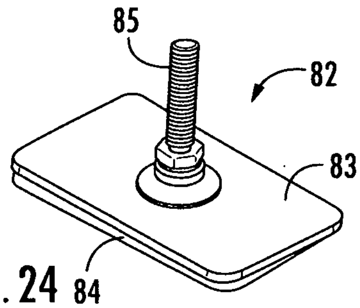
FIG. 24 is a perspective view of a non-slip foot.

Traditionally, the spring activated length adjustment buttons 77 may be located near the lower end of the inner segment which may have two opposing openings through which the buttons protrude after which they may enter any of the series of opposing openings along the outer segment to set the length of the legs 35. In the instant invention there may be two sets of opposing openings near the lower end of the inner segments 37 of both legs 35. The two sets of openings may be the same distance apart as any of the series of evenly spaced opposing openings along the length of the outer segments 38. The spring activated buttons may protrude through the upper set of opposing openings in the inner segment 37. Once the length of the legs 35 has been set, the second set of opposing openings may automatically align with the set of opening in the outer segment directly below the openings through which the spring activated buttons 77 have been set. A pin 78 may be inserted through the lower aligned openings, i.e., completely through the outer segment 38 and inner segment 37, as an additional safety measure to maintain the integrity of the legs 35 under all work conditions and work loads as seen in FIG. 23. The pins 78 may be supplied with pin clamps 79 as seen in FIG. 22 which may insure that the pins 78 cannot be dislodged once set in place. The pin clamps 79 may enable the pins 78 to be inserted and removed as needed while remaining secure once set in place. It may be recommended that the pins 78 be used at all times when the ladder stabilizer 30 is in use with the extension ladder 31.

A non-slip foot 82 may be attached to the bottom of each leg 35, as seen in FIGS. 1, 4, 9 and 24. The non-slip foot 82 may consist of a flat steel plate 83 with a rubber panel 84 affixed to the undersurface. A threaded shaft 85 may be perpendicularly affixed to the center of the steel plate 83 for reversible attachment of the foot 82 to the bottom of the outer segment 38 of each leg 35. The foot 82 may be removable so that wheels may be attached at the bottom of the legs 35 for use under certain work conditions to ease the moving of the ladder from place to place. The wheels may have a locking mechanism so there can be no movement once the ladder is in place and the wheels locked. Such locking wheels are well known in the art and are not illustrated herein.

The legs 35 and braces 36 of the instant invention may be hollow with open ends such that foreign matter may enter these structures. To completely avoid the entry of foreign matter and to provide additional strength and support at the ends, which may also function as points of attachment, reinforcements may be provided in the form of end caps at each end of both the legs and braces.

Figure 25:
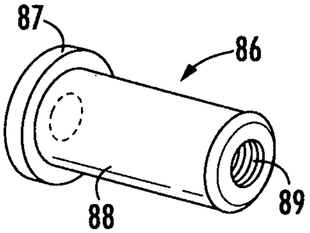
FIG. 25 is a perspective view of the end cap used with the non-slip foot.

To accommodate the non-slip foot 82 and allow for it to be removable there may be an end cap 86 fitted into the open end of the outer segment 38 of each leg 35. This end cap 86 may be seen in FIG. 25. The head 87 of the end cap may be round with a diameter slightly larger than the diameter of the outer wall of the segment 38. The end cap 86 may have a tubular shank 88 integral with the head 87 and having an outer diameter dimensioned to be inserted into the bottom opening in the outer segment 38 of each leg 35 with a tight friction fit. A bore 89 through the tubular shank 88 may be threaded to cooperate with the threaded shaft 85 of the non-slip foot 82 as well as that of a locking wheel if utilized, so either may be reversibly attached to the leg 35 and height adjusted as well.

Figure 26:
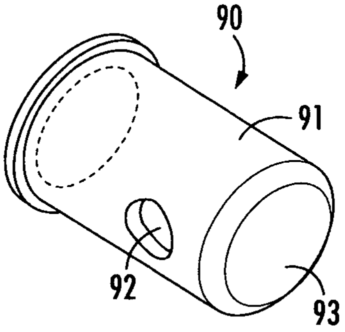
FIG. 26 is a perspective view of the end cap used with the heim joints.

The heim joints may be permanently attached to the legs 35 and braces 36 also utilizing end caps, though of a slightly different design. This end cap 90 seen in FIG. 26 may have a head with a diameter that is substantially the same as the outer diameter of the segment to which it is attached and an integral tubular shank 91. A bore 93 through the end cap 90 may easily accommodate the shaft of the heim joint. The shank 91 may be of sufficiently lesser diameter than the segments of the legs and braces so that it may be inserted easily into both. There may be two opposing openings 92 through the lower part of the shank 91 which may communicate with similar opposing openings through the ends of the walls of the segments of the legs and braces. The shaft of each heim joint 51 may also have a similar opening. Once the end cap 90 has been properly positioned within the segment and the shaft of the heim joint has been inserted through the end cap 90 and into the segment as far as possible, a bolt may be passed through all five openings (the wall of the segment, the shank of the end cap and one in the shaft of the heim joint) and fastened with a nut to secure the heim joint in place. The use of the end cap may provide reinforcement at this critical point of attachment.

Figure 9:
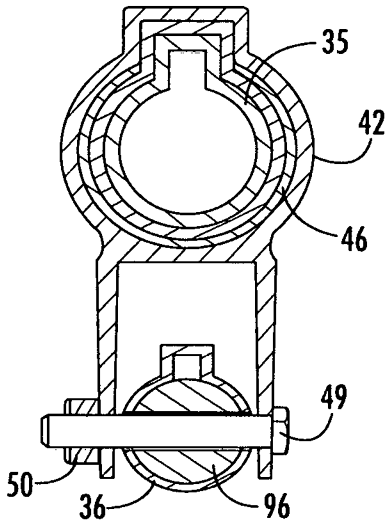
FIG. 9 is a sectional view taken along line A-A of FIG. 8.
Figure 27:
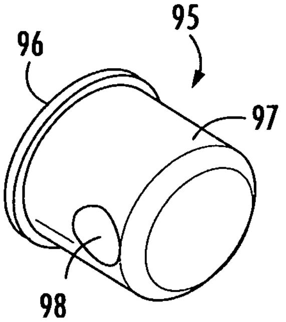
FIG. 27 is a perspective view of the end cap used in the attachment of the braces to the bracket on each leg.

An end cap 95 with a solid surface head 96 and short hollow shank 97 (FIG. 27) also having opposing openings 98 near the end of the shank 97 may be inserted into the end of the inner segment 37 of each brace 36 through which the bolt 49 may be inserted to attach the braces to the legs 35 by means of the bracket 42 as may be seen in FIGS. 8 and 9 also providing reinforcement at this point of attachment.

It may be important to note that heim joints of the type utilized in the instant invention are commercially available in different sizes. The size of the opening in the heim joint may be proportional to the overall size of the heim joint selected for a particular use. It was found that the size of the heim joint used in the instant invention made a significant difference in the range of movement or arc through which the legs may be moved when the stabilizing assembly is oriented for use. If the opening is too large the legs may have a wider range of movement than may be practical, and if the opening is too small the legs may not be able to be placed as needed.

The selection of a specific heim joint may also determine the diameter of the bolt 53 used to attach the legs 35 and braces 36 to the ladder. The bolt 53 must pass through the opening in a heim joint before and after passing through the ladder rung. The adapter 60 may accommodate any difference between the diameter of the bolt 53 and the size of the rung opening, but more then a bare minimal tolerance between the bolt 53 diameter and the diameter of the opening in the heim joint may result in unwanted movement and wobble at critical attachment points.

Figure 28:
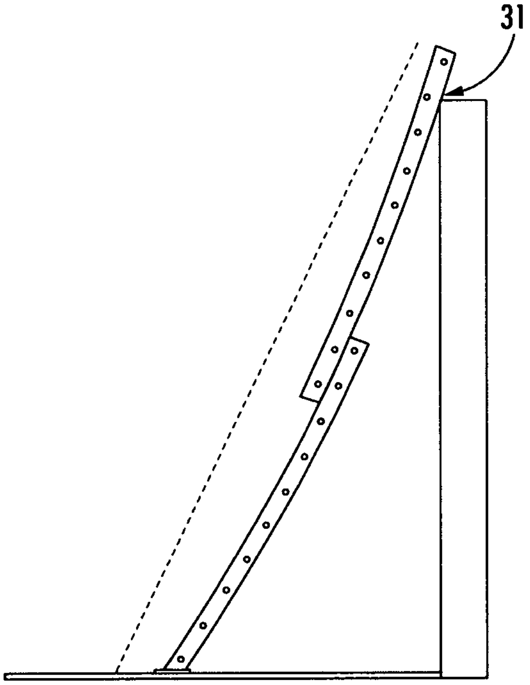
FIG. 28 is a side view representation of an extension ladder exhibiting distortion.
Figure 29:
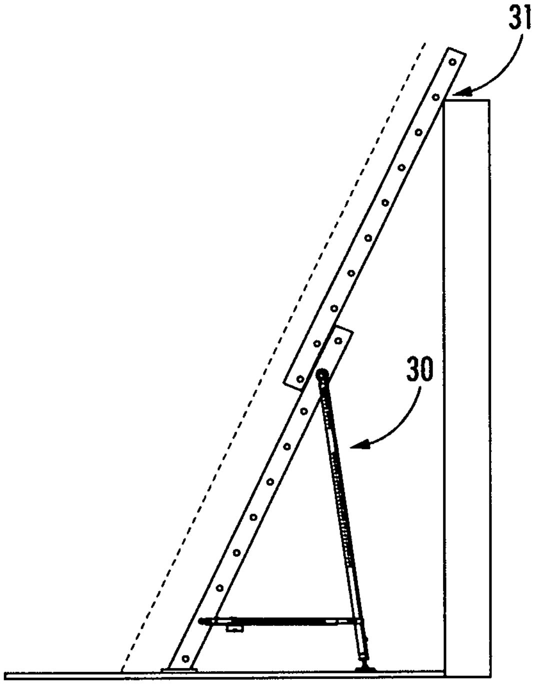
FIG. 29 is a side view representation of an extension ladder with the stabilizing assembly attached with no distortion.

All extension ladders may tend to distort when in use, and the longer the extension the greater may be the distortion. These ladders may also slip when the user climbs above the midsection. This distortion may be seen in FIG. 28. The same ladder used with the stabilizing assembly of the instant invention may have no distortion regardless of the weight load and the height climbed by the user, and there may be no slippage or movement of the ladder under any circumstances. See FIG. 29.

The ladder stabilizing assembly 30 of the instant invention may be marketed ready to be attached to the extension ladder with few steps and tools. The braces may be attached to the legs and the cross-bar may also be attached to one of the braces at the point of manufacture thereby forming two leg assemblies. The complete package may consist of the two leg assemblies, two bolt assemblies (each bolt with two adapters and the nut) and at least two pin clamps. An illustrated instruction sheet may complete the package.

Once the leg assemblies have been attached to the base segment of the extension ladder through the uppermost and lowermost rungs there may be no need to remove any sections or parts when the ladder is not needed. The bracket of the instant invention may slide easily along the specially designed legs and along with the heim joints enable the leg assemblies to essentially fold flat against the ladder rails. The C-clips used to secure the braces against their respective legs aid in forming a single compact and secure unit that may be transported and stored in the same manner as the ladder itself. Once needed again, the set-up may be just as easy to effect.

The legs 25, braces 26, bracket 35 and cross-bar 66 may be made of aluminum with a smooth or powdered finish, as may be the end caps. The legs and braces may be extruded aluminum to obtain the proper shapes and tolerances. The clips and adapters may be of a semirigid polymeric material, and the rest of the clip assemblies may be metal. The pin clamps may be metal and are a commercial product readily available.

While one embodiment of the instant invention has been illustrated and described in detail, it is to be understood that this invention is not limited thereto and may be otherwise practiced within the scope of the following claims.

I claim:

1. A ladder stabilizing assembly for use with an extension ladder having a base segment and an extendable second segment, each segment composed of parallel side rails connected by a series of evenly spaced apart hollow rungs the ends of which communicate with similarly shaped openings in the side rails, said stabilizing assembly comprising:

two length adjustable legs having an upper end and a lower end for attachment of the upper end on opposing sides of the base segment at an uppermost rung thereof, said legs having a non-circular cross section;

two length adjustable braces, a first brace and a second brace, each having an inner end and an outer end for attachment of the inner end on opposing sides of the base segment at a lowermost rung thereof, said braces having a non-circular cross section;

a substantially cylindrical bracket permanently and slidably disposed about each leg for securely attaching the outer end of each brace to the leg situated on the same side of the base segment for smooth movement along said leg and for optimum orientation of said extension ladder, and said bracket having a non-circular cross section;

a heim joint securely affixed to the upper end of each leg and to the inner end of each brace through which the legs and the braces are attached to the base segment, said heim joints to enable said legs and said braces to pivot and swivel for proper orientation of the stabilized extension ladder;

bolt assemblies for attachment of the legs and the braces through the uppermost and lowermost rungs of the base segment and to pass through said heim joints with minimal tolerance;

adapters interposed between the heim joints and the openings in the side rails through which the bolt assemblies are accommodated such that said bolt assemblies cannot move laterally or transversely when properly positioned within the hollow rungs and said legs and said braces are maintained minimally spaced apart from the side rails such that the legs and the braces can be easily positioned to stabilize said extension ladder;

a length adjustable cross bar having a first end and a second end extending between the two braces to limit lateral movement of the legs when the extension ladder is set for use wherein said crossbar is pivotally affixed at the first end to the first brace and reversibly affixed at the second end to the second brace; and means for reversibly affixing the second end of the cross bar to the second brace.

2. A ladder stabilizing assembly as described in claim 1 wherein the legs and braces comprise an outer segment and an inner segment, said outer and inner segments being substantially tubular with a projection extending outward from a wall, along its full length and integral therewith, the projection on the inner segment being substantially square in cross section and the projection on the outer segment being substantially rectangular in cross section and dimensioned to slide smoothly over the square projection when the leg and the brace are length adjusted, a series of evenly spaced apart opposing openings along the full length of the outer segment at substantially 90° from the projection, said inner segment having opposing openings at an inner end thereof, two spring activated buttons situated within said inner segment such that said spring activated buttons extend outward of the opposing openings to communicate with selected said opposing openings in the outer segment to set the length of said legs and said braces, and said opposing openings proximate an outer end of the inner segment of the braces.

3. A ladder stabilizing assembly as described in claim 2 wherein the bracket further comprises a substantially rectangular projection extending outward of the wall thereof and integral therewith, said projection dimensioned to slide smoothly over the rectangular projection on the outer segment of the leg, two arms extending downward from the bracket substantially opposite said projection and spaced apart to admit the outer end of the inner segment of the brace therebetween, said arms each having an aperture proximate a lower end dimensioned to communicate with the opposing openings proximate the outer end of the inner segment of the brace, a bolt to cooperate with said openings and a nut to achieve a secure attachment.

4. A ladder stabilizing assembly for use with an extension ladder having a base segment and an extendable second segment, each segment composed of parallel side rails connected by a series of evenly spaced apart hollow rungs the ends of which communicate with similarly shaped openings in the side rails, said stabilizing assembly comprising:

two length adjustable legs having an upper end and a lower end for attachment of the upper end on opposing sides of the base segment at an uppermost rung thereof, said legs comprising an outer segment and an inner segment, said outer and inner segments being substantially tubular with a projection extending outward from a wall, along its full length and integral therewith, the projection on the inner segment being substantially square in cross section and the projection on the outer segment being substantially rectangular in cross section and dimensioned to slide smoothly over the square projection when the leg is length adjusted, a series of evenly spaced apart opposing openings along the full length of the outer segment at substantially 90° from the projection, and said inner segment having opposing openings at an inner end thereof and two spring activated buttons situated within said inner segment such that said spring activated buttons extend outward of the opposing openings to communicate with selected said opposing openings in the outer segment to set the length of said legs;

two length adjustable braces, a first brace and a second brace, each having an outer end and an inner end for attachment of the inner end on opposing sides of the base segment at a lowermost rung thereof said braces comprising an outer segment and an inner segment, said outer and inner segments being substantially tubular with a projection extending outward from the wall along its full length and integral therewith, the projection on the inner segment being substantially square in cross section and the projection on the outer segment being substantially rectangular in cross section and dimensioned to slide smoothly over the square projection when the brace is length adjusted, a series of evenly spaced apart opposing openings along the full length of the outer segment at substantially 900 from the projection, said inner segment having opposing openings at an inner end thereof and two spring activated buttons situated within said inner segment such that said spring activated buttons extend outward of the opposing openings to communicate with selected opposing openings in the outer segment to set the length of said brace, and said inner segment having said opposing openings proximate the outer end thereof;

a substantially cylindrical bracket slidably disposed on each leg for securely attaching the outer end of the brace to the leg situated on the same side of the base segment, said bracket comprising a substantially rectangular projection extending outward of the wall thereof and integral therewith, said projection dimensioned to slide smoothly over the rectangular projection on the outer segment of the leg, two arms extending downward from the cylindrical bracket substantially opposite said projection and spaced apart to admit the outer end of the brace therebetween, said arms each having 8 an aperture proximate a lower end dimensioned to communicate with the opposing openings proximate the outer end of the brace, a bolt to cooperate with the openings and a nut to achieve a secure attachment;

means disposed on the upper ends of the legs and the inner ends of the braces through which the legs and the braces are attached to the base segment, said means for enabling said legs and said braces to pivot and swivel for proper orientation of the stabilized extension ladder;

bolt assemblies for attachment of the legs and the braces through the uppermost and lowermost rungs of the base segment and to pass through the pivot and swivel means with minimal tolerance and through the hollow rungs with ease;

adapters interposed between the pivot and the swivel means and the openings in the side rails through which the bolt assemblies are accommodated such that said bolt assemblies cannot move laterally or transversely when properly positioned within the hollow rungs and said legs and said braces are maintained minimally spaced apart from the side rails such that the legs and the braces can be easily positioned to stabilize said extension ladder;

a length adjustable cross bar having a first end and a second end extending between the two braces to limit lateral movement of the legs when the ladder is set for use wherein said crossbar is pivotally affixed at the first end to the first brace and reversibly affixed at the second end to the second brace;

means for reversibly affixing said second end to the second brace; and means for maintaining the integrity of the legs so as to permit heavy loads to be carried on the ladder.

5. A ladder stabilizing assembly for use with an extension ladder having a base segment and an extendable second segment, each segment composed of parallel side rails connected by a series of evenly spaced apart hollow rungs the ends of which communicate with similarly shaped openings in the side rails, said stabilizing assembly comprising:

two length adjustable legs for attachment on opposing sides of the base segment at an uppermost rung thereof, each leg having an upper end and a lower end and comprising an outer segment and an inner segment, said outer and inner segments being substantially tubular with a projection extending outward from a wall, along its full length and integral therewith, the projection on the inner segment being substantially square in cross section and the projection on the outer segment being substantially rectangular in cross section and dimensioned to slide smoothly over the square projection when the leg is length adjusted, a series of evenly spaced apart opposing openings along the full length of the outer segment at substantially 90° from the projection, and said inner segment having a first set and a second set of spaced apart opposing openings proximate an inner end thereof and two spring activated buttons situated within said inner segment such that said spring activated buttons extend outward of the first set of opposing openings to communicate with selected opposing openings in the outer segment to set the length of said leg;

two length adjustable braces for attachment on opposing sides of the base segment at a lowermost rung thereof, each brace comprising a first end and a second end, an outer segment and an inner segment, said outer and inner segments being substantially tubular with a projection extending outward from a wall, along its full length and integral therewith, the projection on the inner segment being substantially square in cross section and the projection on the outer segment being substantially rectangular in cross section and dimensioned to slide smoothly over the square projection when the brace is length adjusted, a series of evenly spaced apart opposing openings along the full length of the outer segment at substantially 90° from the projection, said inner segment having opposing openings proximate an inner end thereof and two spring activated buttons within said inner segment such that said spring activated buttons extend outward of the opposing openings to communicate with selected said opposing openings in the outer segment to set the length of said brace, and said inner segment having said opposing openings proximate an outer end thereof;

a heim joint securely affixed to the upper end of each leg and to the first end of each brace through which the legs and braces are attached to the base segment, said heim joints to enable said legs and said braces to pivot and swivel for proper orientation of the stabilized extension ladder;

means for attaching the legs and the braces to the base segment; and a cylindrical bracket slidably disposed on each leg for securely attaching the second end of the brace to the leg situated on the same side of the base segment, said bracket comprising a substantially rectangular projection extending outward of a wall thereof and integral therewith, said projection dimensioned to slide smoothly over the rectangular projection on the outer segment of the leg, two arms extending downward from the cylindrical bracket substantially opposite said projection and spaced apart to admit the second end of the brace therebetween, said arms each having an aperture proximate a lower end dimensioned to communicate with the opposing openings proximate the outer end of the inner segment of the brace, a bolt to cooperate with the openings and a nut to achieve a secure attachment.

6. A ladder stabilizing assembly as described in claim 5 further comprising a liner interposed between the bracket and the outer segment of the leg to prevent damage to contact surfaces, to act as a lubricant between surfaces, to prevent wobble between the bracket and the leg, and to maintain uniform spacing between the bracket and the leg, and means for maintaining the liner in place.

7. A ladder stabilizing assembly as described in claim 5 wherein the heim joints are securely affixed to the upper end of each leg and the first end of each brace by a shaft integral with and extending from the heim joint into the upper end of the leg and the first end of the brace, said shaft having a transverse opening therethrough, an end cap disposed within the upper end of each leg and the first end of each brace, said end caps having a cylindrical body of lesser diameter than the upper end of the leg and the first end of the brace to enable easy insertion therein and an upper rim of greater diameter than the upper end of the leg and first end of the brace to be prevented from insertion therein, a bore centrally disposed through the end cap to accept the shaft, and opposing openings substantially centered along the cylindrical body of the end cap, opposing openings in the upper end of the leg and the first end of the brace to communicate with the openings in the end cap and the opening in the shaft, a bolt to cooperate with all openings and a nut to achieve a secure attachment, whereby the heim joints are secured to the upper end of the leg and the first end of the brace and the end caps provide additional strength to points of attachment of the heim joints to the legs and the braces.

8. A ladder stabilizing assembly as described in claim 5 further comprising an end cap disposed within the outer end of the inner segment of each brace, said end caps comprising a hollow cylindrical shank with a solid head of greater diameter, said shank having opposing openings to communicate with the opposing openings proximate the outer end of the inner segment of the brace such that a bolt for attachment of the outer end of the inner segment of the brace to the bracket cooperates with the openings in the brace and the end cap, and a nut for secure attachment of the brace to the bracket whereby said end cap provides additional strength to a point of attachment.

9. A ladder stabilizing assembly as described in claim 5 further comprising a positioning block permanently affixed to a lower portion of each leg to set the position of the braces for the optimum orientation of the stabilizing assembly and to function as a stop to prevent the bracket from being removed from the leg.

10. A ladder stabilizing assembly as described in claim 5 further comprising a length adjustable cross bar having a first end and a second end wherein the first end is pivotally attached to one of said braces and the second end is reversibly attached to the opposing brace when the stabilizing assembly is oriented for use, said cross bar to limit lateral movement of the legs, and means for effecting the reversible attachment of the second end to the opposing brace.

11. A ladder stabilizing assembly as described in claim 10 wherein the means for effecting the reversible attachment of the second end of the cross bar to the opposing brace comprises a C-shaped elongated clip affixed to the second end of the cross bar, said clip having an integral base extending along the underside thereof and an aperture centrally disposed therethrough, a bolt having a head, a shank and a threaded end, said aperture in the clip dimensioned to countersink the head, a first nut to secure the attachment and a second nut disposed between the clip and the cross bar to facilitate the rotation of the clip for ease of attachment.

12. A ladder stabilizing assembly as described in claim 11 wherein said clip is composed of a semirigid polymeric material having sufficient resilience for repeated reversible attachments of the clip to the opposing brace.

13. A ladder stabilizing assembly as described in claim 11 further comprising two positioning blocks permanently attached to the opposing brace for optimum positioning of the clip therebetween when the second end of the crossbar is attached to said opposing brace.

14. A ladder stabilizing assembly as described in claim 11 further comprising two additional clips, one disposed on each brace for reversible attachment of an end of said brace to the leg on the same side of the ladder during transport and storage.

15. A ladder stabilizing assembly as described in claim 5 wherein the means for attaching the legs and the braces to the base segment comprises a bolt of sufficient length to pass through the hollow rung and the heim joints affixed to the legs and the braces on each side of the ladder and to extend therebeyond, said bolt having a smooth solid cylindrical body, an extended threaded end and a head of larger diameter than said bolt and integral therewith, and a nut threaded to cooperate with the threaded end of said bolt, the diameter of said bolt being dimensioned to pass through said heim joints with minimal tolerance and through said hollow rungs with ease.

16. A ladder stabilizing assembly as described in claim 15 wherein the head of the bolt and the nut are of the same configuration, each having two opposing flat side surfaces, two opposing convex side surfaces, and a partially convex top surface.

17. A ladder stabilizing assembly as described in claim 15 further comprising an adapter to be disposed on the bolt and interposed between the heim joints and the side rails, said adapter configured to be accepted into the openings in the side rails communicating with the uppermost and lowermost rungs of the base segment, to prevent lateral and transverse movement of the the bolt when the legs and the braces are attached to the ladder, and to provide adequate space between the legs and the braces and the side rails to enable sufficient movement of the legs and the braces to attain the optimum orientation of the stabilized ladder, said adapter comprising a substantially half-moon shaped forward portion integral with a cylindrical shank and having a bore therethrough, said bore dimensioned to accept the bolt with minimal tolerance and said forward portion being tapered for acceptance into the openings in the side rails.

18. A ladder stabilizing assembly as described in claim 17 further comprising a series of axial splines lining the bore along its full length.

19. A ladder stabilizing assembly as described in claim 5 further comprising a non-slip foot reversibly affixed to the lower end of the leg, said foot comprising a metal plate having an upper surface and a lower surface, a rubber panel adhered to the lower surface and a threaded shank perpendicular to and substantially centered on the upper surface and means for reversibly affixing the foot to the lower end of the leg.

20. A ladder stabilizing assembly as described in claim 19 wherein the means for reversibly affixing the foot to the lower end of the leg comprises an end cap having a hollow shaft dimensioned to be friction fitted into the lower end of the leg and a rim wider than the shaft so as not to fit into the lower end of the leg and a threaded bore therethrough, and said threaded bore cooperating with the threaded shank of the foot whereby the foot can be affixed to the lower end of the leg, length adjusted thereon, can be removed from said foot, and replaced thereon.

21. A ladder stabilizing assembly as described in claim 5 further comprising a pin dimensioned to cooperate with and extend through spaced apart said opposing openings along the outer segment of the leg and the second set of opposing openings in the inner segment to provide additional security by maintaining the integrity 16 of the legs when the stabilized ladder is in use and to permit heavy loads of material to be carried on said stabilized ladder.

22. A ladder stabilizing assembly as described in claim 15 further comprising an adapter to be disposed on the bolt and interposed between the heim joints and the side rails, said adapter configured to be accepted into the openings in the side rails communicating with the uppermost and lowermost rungs of the base segment, to prevent and transverse movement of the bolt when the legs and the braces are attached to the extension ladder, and to provide adequate space between the legs and the braces and the side rails to enable sufficient movement of the legs and the braces to attain the optimum orientation of the extension ladder, said adapter comprising a forward portion shaped to conform to the openings in the side rails and integral with a cylindrical shank and having a bore therethrough, said bore dimensioned to accept the bolt with minimal tolerance and said forward portion being tapered for acceptance into the openings in the side rails.

* * * * *